US 7,003,191 B2

(12) United States Patent
Sunaga et al.

(10) Patent No.: US 7,003,191 B2
(45) Date of Patent: Feb. 21, 2006

(54) OPTICAL SWITCH

(75) Inventors: Takahiro Sunaga, Kanagawa (JP); Makoto Katayama, Kanagawa (JP); Tomohiko Kanie, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/790,020

(22) Filed: Mar. 2, 2004

(65) Prior Publication Data

US 2004/0179772 A1 Sep. 16, 2004

Related U.S. Application Data

(60) Provisional application No. 60/501,848, filed on Sep. 11, 2003.

(30) Foreign Application Priority Data

Mar. 11, 2003 (JP) ............................. 2003-065472

(51) Int. Cl.
*G02B 6/26* (2006.01)
*G02B 6/42* (2006.01)
(52) U.S. Cl. ..................................... 385/17; 385/18
(58) Field of Classification Search ................ 385/17, 385/18, 45, 49, 50, 56, 57
See application file for complete search history.

(56) References Cited

U.S. PATENT DOCUMENTS

| 6,243,178 B1 * | 6/2001 | Suemura et al. ............... 398/56 |
| 6,587,610 B1 * | 7/2003 | Ao .............................. 385/17 |
| 6,738,540 B1 * | 5/2004 | Marom ......................... 385/17 |
| 6,907,154 B1 * | 6/2005 | Oikawa et al. ................ 385/17 |

OTHER PUBLICATIONS

Dellmann, L., et al. "4×4 Matrix Switch Based in Mems Switches and Integrated Waveguides." The 11th International Conference on Solid-State Sensors and Actuators, Munich Germany, Jun. 10-14, 2001, pp. 1332-1335.
Lin, L.Y., et al. Free-Space Micromachined Optical Switches with Submillisecond Switching time for Large Scale Optical Crossconnects. IEEE Photonics Technology Letters, vol. 10, No. 4, Apr., 1998, pp. 525-527.

* cited by examiner

*Primary Examiner*—Brian Healy
*Assistant Examiner*—Charlie Peng
(74) *Attorney, Agent, or Firm*—McDermott Will & Emery LLP

(57) ABSTRACT

An optical switch is provided in which the difference of the optical loss due to the difference of optical path can be reduced. The optical switch comprises the first switching parts 2A–2D and the second switching parts 3A–3D. The first switching parts 2A–2D each comprise: a planar waveguide device 4 in which four coupling optical waveguides 5a–5d and an input optical waveguide 6 are provided; and reflection mirrors 8a–8d for reflecting a light signal incident from the input optical waveguide 6 to the respective coupling optical waveguides 5a–5d, respectively. The second switching parts 3A–3D each comprise: a planar waveguide device 9 in which coupling optical waveguides 10a–10d and an output optical waveguide 11 are provided; and reflection mirrors 13a–13d for reflecting a light signal incident from the respective coupling optical waveguides 10a–10d to the output optical waveguide 11. The optical switch is provided with 16 optical fibers 20 for connecting the coupling optical waveguides 5a–5d of the first switching parts 2A–2D to the different second coupling optical waveguides 10a–10d of the second switching parts 3A–3D, respectively.

5 Claims, 7 Drawing Sheets

OPTICAL SWITCH

This application claims the benefit of Provisional Application 60/501,848, filed Sep. 11, 2003.

BACKGROUND OF THE INVENTION

1. Field of the Invention

The present invention relates to an optical switch which can be used in an optical communication system.

2. Description of the Background Art

An optical switch for use in an optical communication system is disclosed in "4×4 MATRIX SWITCH BASED ON MEMS SWITCHES AND INTEGRATED WAVEGUIDES," The 11$^{th}$ International Conference on Solid-State Sensors and Actuators, Munich, Germany, Jun. 10–14, 2001. The optical switch described in this literature consists of a planar waveguide device chip having four input ports and four output ports and a switch chip having 16 micro mirrors to reflect light incident from the input ports to the output ports.

In this optical switch, the length of optical waveguide from the input port to the output port differs depending on the course of light, and optical loss (waveguide loss) increases according to the increase in the length of optical waveguide. Thus, the waveguide loss in the shortest distance of the optical waveguide differs from that in the longest one.

SUMMARY OF THE INVENTION

An object of the present invention is to provide an optical switch in which the difference of the optical loss due to the difference in the optical path from an input port to an output port can be decreased. In order to achieve the object, the optical switch according to one embodiment of the present invention has N number of input ports and N number of output ports (herein "N" is a plural number) such that the loss of light due to passage in the respective (N×N) optical paths each formed between an input port and an output port is substantially the same. Here, the term "the loss is substantially the same" means that "the difference between the maximum loss and the minimum loss is 0.8 dB or less." The optical switch may have N number of first switching parts each having one input port and N number of first coupling ports; N number of second switching parts each having one output port and N number of second coupling ports; and (N×N) number of optical fibers which connect each of the first coupling ports of the respective first switching parts to one of the second coupling ports of the different second switching parts.

According to one embodiment of the present invention, an optical switch has N number of input ports and N number of output ports, and comprises: N number of first switching parts each having one input port of the N number of input ports, N number of first coupling ports, and a plurality of optical path switching elements; N number of second switching parts each having one output port of the N number of output ports, N number of second coupling ports, and a plurality of optical path switching elements; and N number of optical fibers which connect the first coupling ports and the second coupling ports, wherein the difference between the maximum and the minimum in terms of the number of the optical path switching elements through which each of N×N number of optical paths passes from the input ports to the output ports passes is equal to or less than 4.

According to another embodiment of the present invention, an optical switch is provided with N number of input ports and N number of output ports, and comprises: N number of first switching parts each having one input port of the N number of input ports, and N number of first coupling ports; N number of second switching parts each having one output port of the N number of output ports, and N number of second coupling ports; and N×N number of optical fibers which connect the first coupling ports and the second coupling ports such that half the number or more of first coupling ports P1$i$ of the N×N first coupling ports are connected with second coupling ports P2(N+1−$i$), where P1$i$ is a first coupling port corresponding to an optical path which comes in the "$i$"th shorter one in terms of the optical path length between the input port and one of the first coupling ports in each first switching part, and P2$j$ is a second coupling port corresponding to the "$j$"th shorter one in terms of the optical path length between the output port and one of the second coupling ports in each second switching part.

Advantages of the present invention will become readily apparent from the following detailed description simply made by way of illustration of the best mode contemplated of carrying out the invention. The invention is capable of other and different embodiments, the details of which are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawing, in which like reference numerals refer to similar elements.

DETAILED DESCRIPTION OF THE INVENTION

Figure 1:
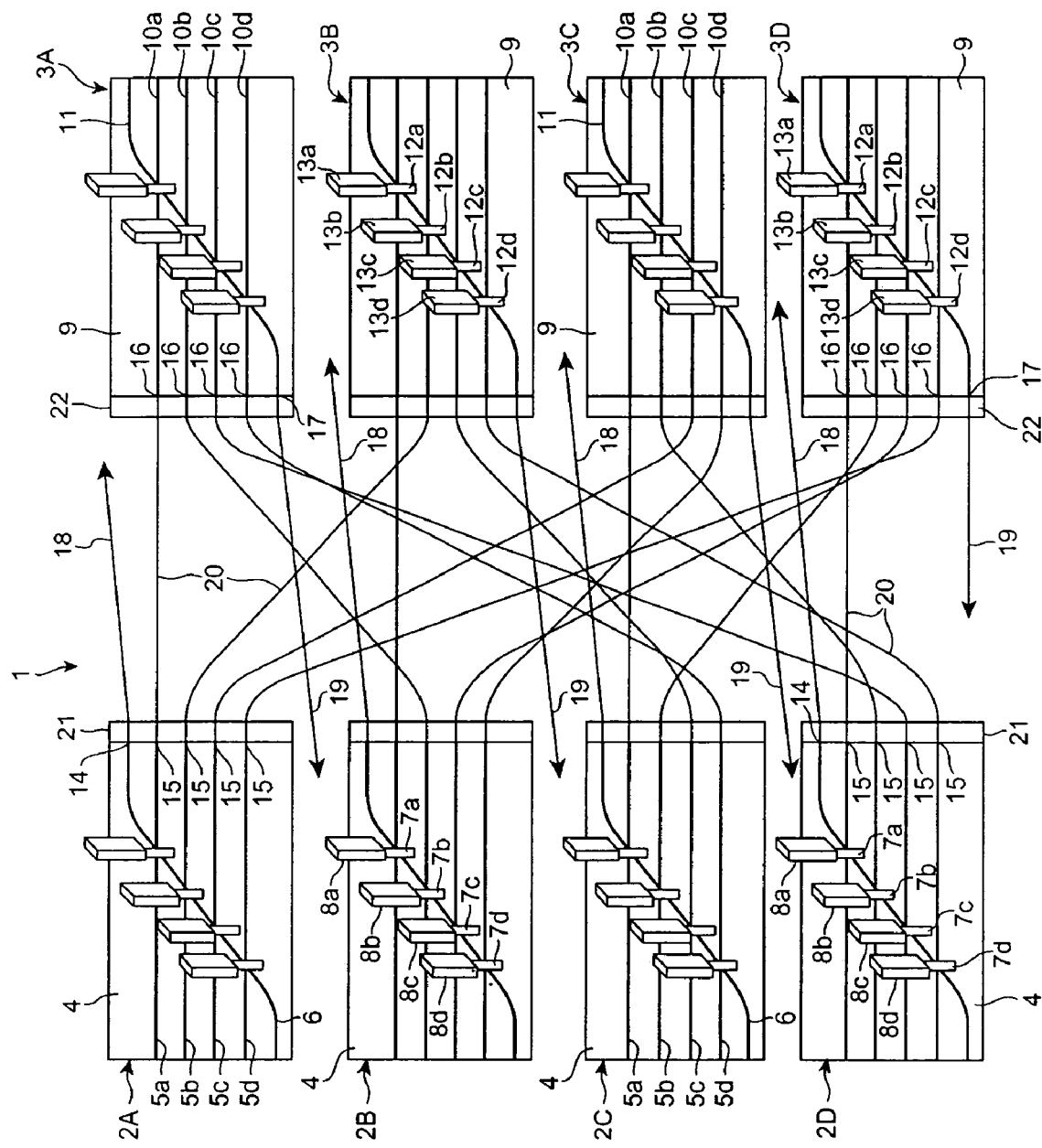
FIG. 1 is a schematic diagram showing an optical switch according to one embodiment of the present invention.

FIG. 1 is a schematic diagram showing an optical switch according to one embodiment of the present invention. An optical switch 1 is a 4×4 switch having four light input ports and four light output ports. The optical switch 1 has four 4×1 first switching parts 2A–2D and four 4×1 second switching parts 3A–3D.

The first switching parts 2A–2D each have a first planar waveguide device 4 which is provided with four first coupling optical waveguides 5$a$–5$d$ and one input optical waveguide 6. The coupling optical waveguides 5$a$–5$d$ are disposed extending in parallel to each other at an equal pitch. The input optical waveguide 6 is formed so as to cross the coupling optical waveguides 5a–5d obliquely and to extend in parallel with the coupling optical waveguides 5a–5d at both ends thereof.

Trenches 7a–7d are formed, extending in a direction perpendicular to the coupling optical waveguides 5a–5d, at the cross-points of coupling optical waveguides 5a–5d and the input optical waveguide 6, respectively, in the planar waveguide device 4. First reflection mirrors 8a–8d for reflecting an incident light signal from the input optical waveguide 6 to the respective coupling optical waveguides 5a–5d are inserted in the trenches 7a–7d, respectively. The trenches 7a–7d and the reflection mirrors 8a–8d form optical path switching elements.

The second switching parts 3A–3D have the same structure as the above-mentioned first switching parts 2A–2D. That is, the second switching parts 3A–3D each have a second planar waveguide device 9, which is provided with four second coupling optical waveguides 10a–10d and an output optical waveguide 11. The coupling optical waveguides 10a–10d are formed extending in parallel to each other at an equal pitch. The output optical waveguide 11 is formed so as to cross the coupling optical waveguides 10a–10d obliquely and to extend in parallel with the coupling optical waveguide 10a–10d at both ends thereof.

Trenches 12a–12d are formed, extending in a direction perpendicular to the coupling optical waveguides 10a–10d, at the cross-points of coupling optical waveguides 10a–10d and the output optical waveguide 11, respectively, in the planar waveguide device 9. Second reflection mirrors 13a–13d for reflecting an incident light signal from the coupling optical waveguides 10a–10d to the output optical waveguide 11 are inserted in the trenches 12a–12d, respectively. The trenches 12a–12d and the reflection mirrors 13a–13d form optical path switching elements.

The first switching parts 2A–2D and the second switching parts 3A–3D are disposed facing in parallel to each other. The first switching parts 2A–2D are structured such that the end (on the side nearer to the second switching parts 3A–3D) of the input optical waveguide 6 constitutes an input port 14 on which a light signal is to be incident, and the ends (on the side nearer to the second switching parts 3A–3D) of the coupling optical waveguides 5a–5d constitute the first coupling ports 15 from which a light signal is emitted. Also, the second switching parts 3A–3D are structured such that the ends (on the side nearer to the first switching parts 2A–2D) of the coupling optical waveguides 10a–10d respectively constitute the second coupling ports 16 on which light signals are to be incident, and the end (on the side nearer to the first switching parts 2A–2D) of the output optical waveguide 11 constitutes the output port 17 from which a light signal is emitted.

An input optical fiber 18 is connected with the input port 14 of the first switching parts 2A–2D and an output optical fiber 19 is connected with the output optical waveguide 11 of the second switching parts 3A–3D. Also, the first coupling ports 15 of the first switching parts 2A–2D are structured so as to respectively connect through the coupling optical fibers 20 with the different second coupling ports 16 of the second switching parts 3A–3D.

For example, such a connection is made in a manner such that with respect to the 16 optical paths the differences between the maximum and the minimum in terms of the number of the optical path switching elements through which a light signal passes from the input port 14 to the output port 17 are equal to or less than 4, and preferably equal to or less than 2.

In this case, preferably half the number or more of first coupling ports Q1$i$ of the N×N first coupling ports are connected with second coupling ports Q2(N+1−$i$), where Q1$i$ is a first coupling port corresponding to an optical path which comes in the "$i$"th fewer one in terms of the number of the optical path switching elements through which the respective optical paths pass between the input port and one of the first coupling ports in each first switching part, and Q2$j$ is a second coupling port corresponding to the "$j$"th fewer one in terms of the number of the optical path switching elements through which the respective optical paths pass between the output port and one of the second coupling ports in each second switching part.

Furthermore, more preferably, the number of optical path switching elements through which a light signal passes in each of N×N number of optical paths from the input port to the output port is all equal.

Or, half the number or more of first coupling ports P1$i$ of the N×N first coupling ports are connected with second coupling ports P2(N+1−$i$), where P1$i$ is a first coupling port corresponding to an optical path which comes in the "$i$"th shorter one in terms of the optical path length between the input port 14 and one of the first coupling ports 15 in each of the first switching parts 2A–2D, and P2$j$ is a second coupling port corresponding to the "$j$"th shorter one in terms of the optical path length between the output port 17 and one of the second coupling ports 16 in each of the second switching parts 3A–3D. In this case, preferably the optical path lengths of the N×N number of optical paths from the input port to the output port are substantially the same.

Or, such a connection is made in a manner such that the losses of light due to passage in (N×N) optical paths each formed between the input port 14 and the output port 17 are substantially the same. Here, the term "the losses are substantially the same" means that "the differences between the maximum loss and the minimum loss are 0.8 dB or less." This is approximately equivalent to the case where the difference in the number of the optical path switching elements through which a light signal passes is four or less. More preferably, the difference in the loss is equal to or less than 0.4 dB. More specifically, the first coupling ports 15 and the second coupling ports 16 are connected as shown in Table I.

TABLE I

| First switching part | Coupling waveguide | Second switching part | Coupling waveguide |
| --- | --- | --- | --- |
| 2A | 5a | 3A | 10a |
|    | 5b | 3B | 10b |
|    | 5c | 3C | 10c |
|    | 5d | 3D | 10d |
| 2B | 5a | 3B | 10a |
|    | 5b | 3A | 10b |
|    | 5c | 3D | 10c |
|    | 5d | 3C | 10d |
| 2C | 5a | 3C | 10a |
|    | 5b | 3D | 10b |
|    | 5c | 3B | 10c |
|    | 5d | 3A | 10d |
| 2D | 5a | 3D | 10a |
|    | 5b | 3C | 10b |
|    | 5c | 3A | 10c |
|    | 5d | 3B | 10d |

In the first switching parts 2A–2D, the length of optical waveguide from the input port 14 to a first coupling port 15 is longer in the order from the coupling optical waveguide 5a to the coupling optical waveguide 5d, and in the second switching parts 3A–3D, the length of the optical waveguide between a second coupling port 16 and the output port 17 is shorter in the order of the coupling optical waveguide 10a to the coupling optical waveguide 10d. By making the coupling arrangement in a manner as shown in Table I, the length of the optical waveguide from the input port 14 to the respective first coupling ports 15 in the first switching parts 2A–2D plus the length of the optical wave guide from the respective second coupling ports 16 to the output port 17 in the second switching parts 3A–3D becomes equal with respect to all of the 16 courses. Also, the number of the optical path switching elements through which a light signal passes in the respective courses from the input port to the output port becomes equal in the coupling arrangement shown in Table I, and the optical loss due to passage of light through the optical path switching elements becomes equal regardless of the course.

The input port 14 of the first switching parts 2A–2D and the input optical fiber 18, and the first coupling ports 15 and the coupling optical fibers 20, are connected respectively through a fiber array 21. The second coupling ports 16 of the second switching parts 3A–3D and the coupling optical fibers 20, and the output port 17 and the output optical fiber 19, are connected respectively through a fiber array 22. The fiber arrays 21 and 22 are fixed with an adhesive to the end face of the planar waveguide devices 4 and 9 after their path alignment (alignment of optical axes) has been done. In this case, the adhesive does not adversely affect the transmission of light because its refractive index is adjusted.

Figure 2:
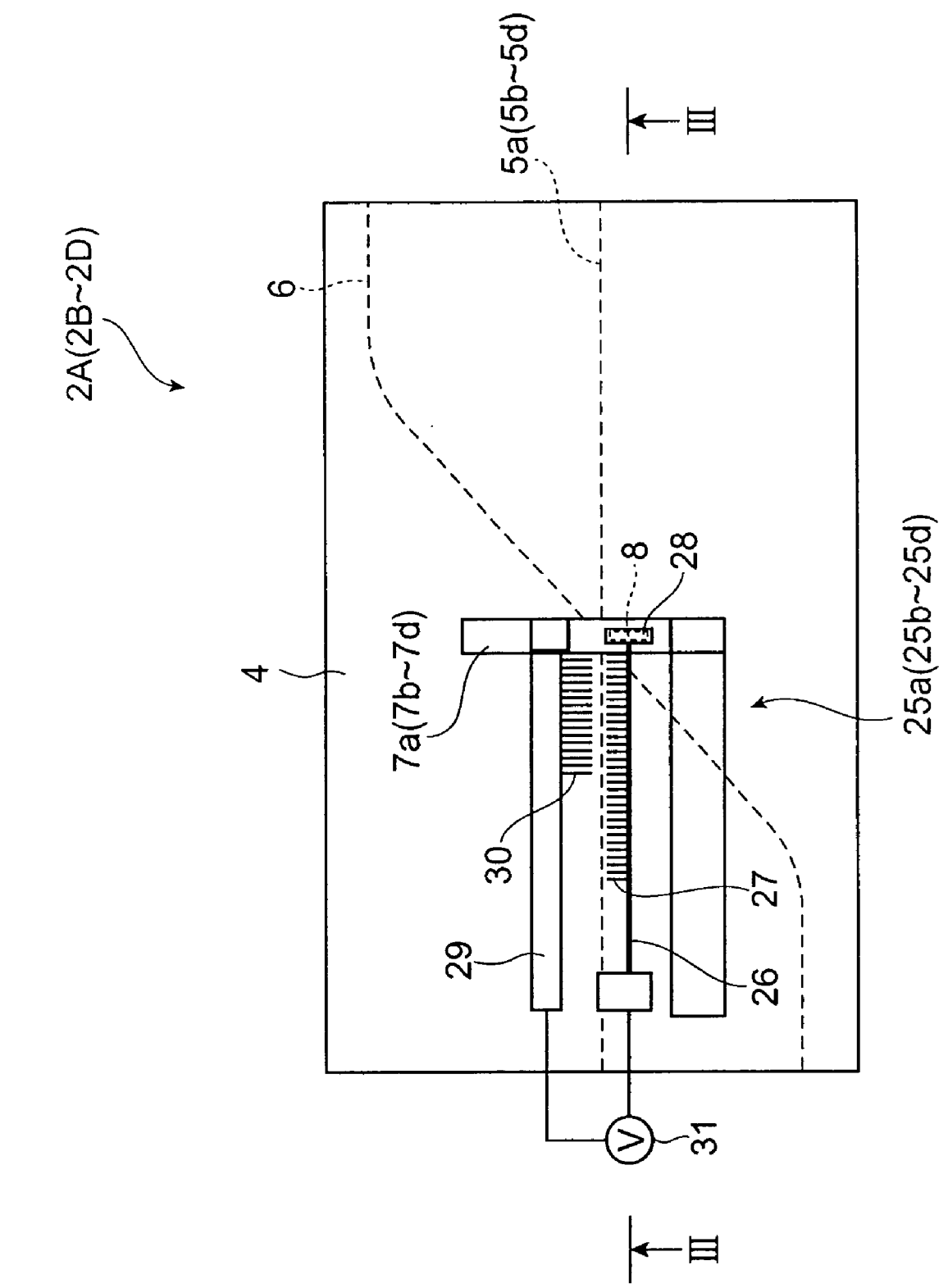
FIG. 2 is a horizontal sectional view of a first switching part 2A to 2D, which is included in the optical switch 1 shown in FIG. 1.
Figure 3:
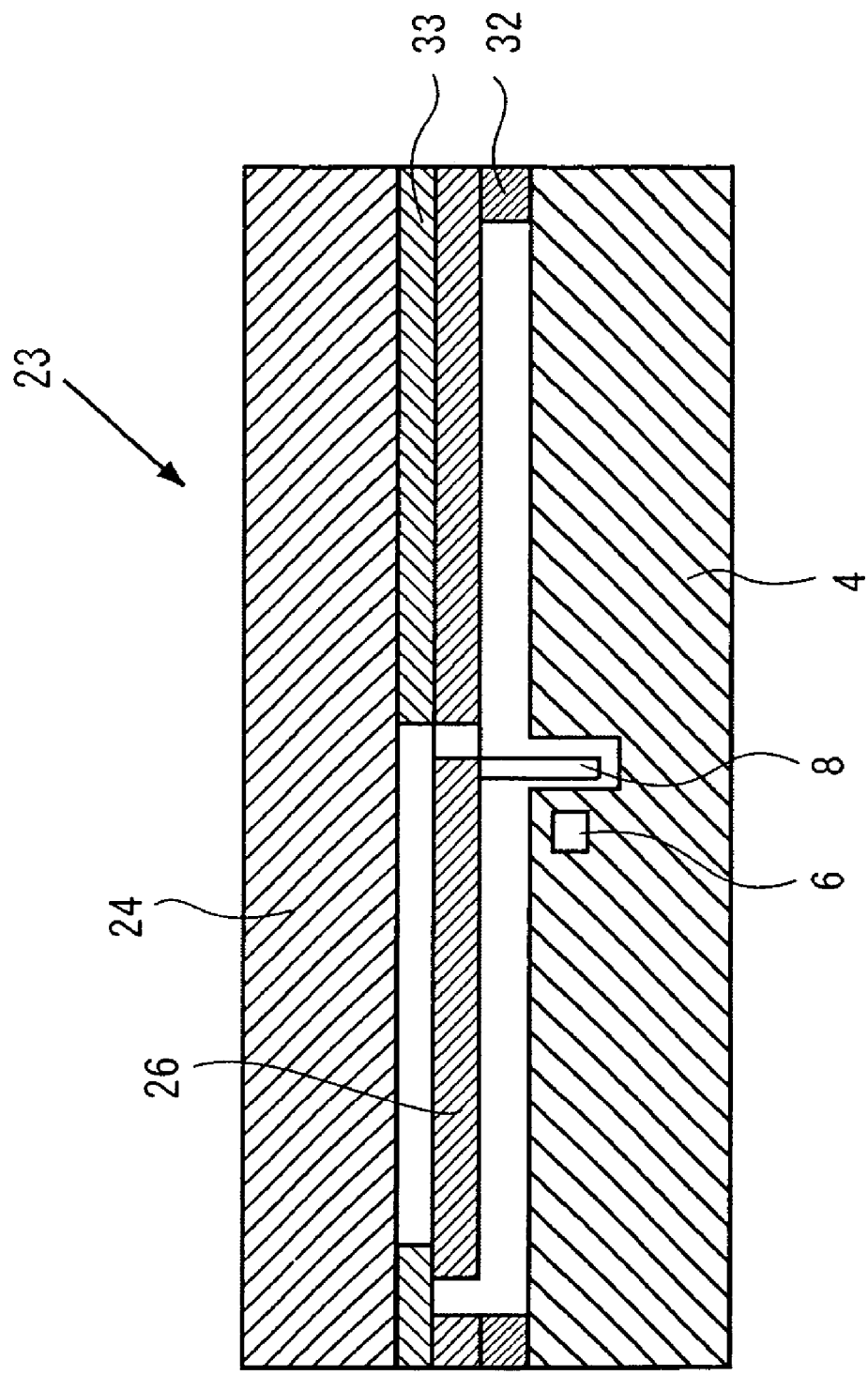
FIG. 3 is a sectional view taken along lines III—III of FIG. 2.
Figure 4:
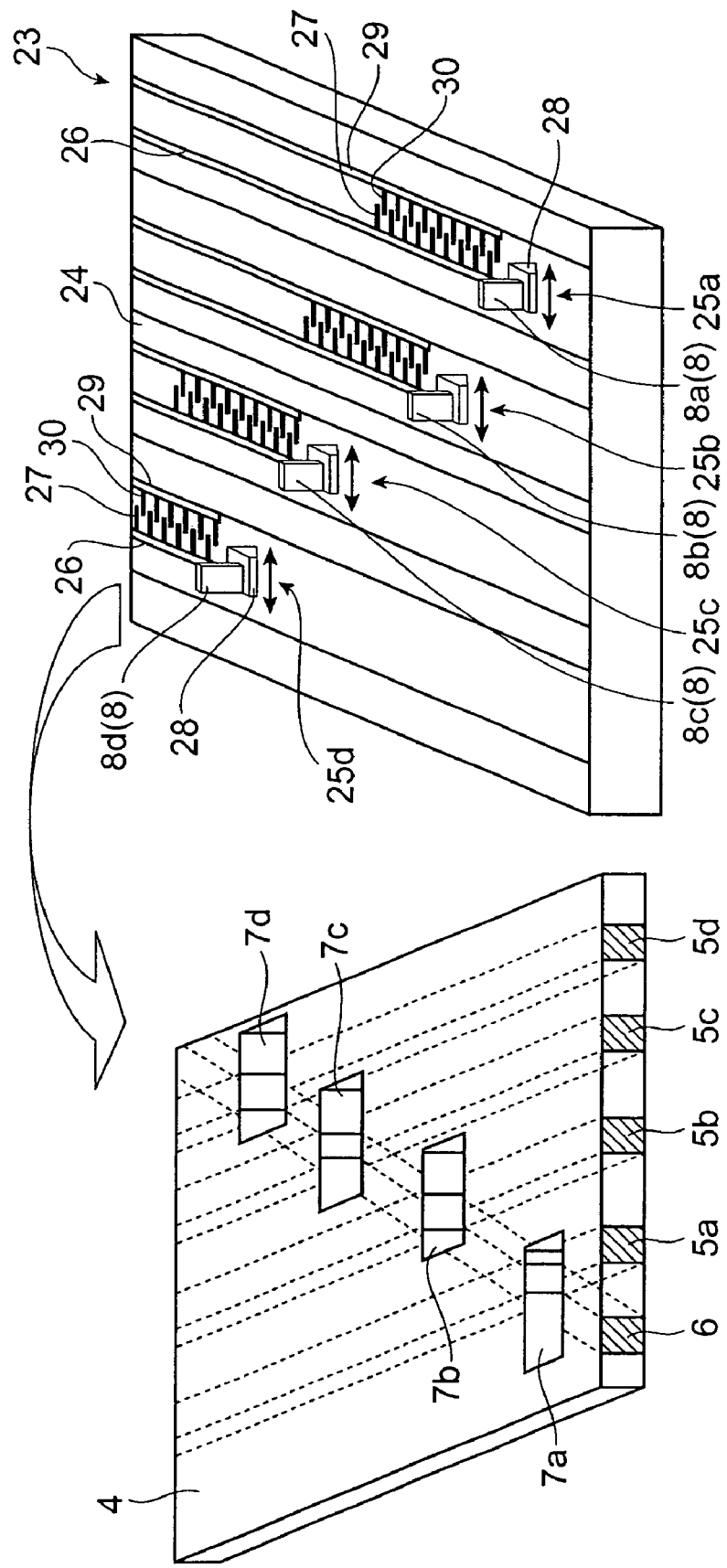
FIG. 4 is an exploded perspective view of the first switching part 2A to 2D which is included in the optical switch 1 of FIG. 1.

The structure of the first switching parts 2A–2D will be described hereinafter with reference to FIG. 2–FIG. 4. FIG. 2 is a horizontal sectional view of the first switching parts 2A–2D of the optical switch 1 shown in FIG. 1. FIG. 3 is a sectional view taken along the lines III—III of the sectional view of FIG. 2, and FIG. 4 is an exploded perspective view of the first switching parts 2A–2D. In FIG. 2, only one of the coupling optical waveguides is illustrated, expanding the cross point of the input optical waveguide and the coupling optical waveguide.

The first switching parts 2A–2D are each structured such that an MEMS structure 23 formed using the Micro Electro Mechanical Systems technique is fixed to the planar waveguide device 4 through a spacer. The MEMS structure 23 has a Si substrate 24, which is provided with four actuators 25a–25d corresponding to the four coupling optical waveguides 5a–5d.

The actuators 25a–25d are each equipped with a cantilever 26 which is disposed in the Si substrate 24 through an insulation layer. The cantilever 26 is made of Si having conductivity, or the like material, and is provided with a comb teeth part 27 consisting of a plurality of teeth. A supporting member 28 is provided at the tip of the cantilever 26 and reflection mirrors 8 (8a–8d) are fixed to the supporting member 28. The reflection mirrors 8 are also made of Si having conductivity, or the like material. The light-reflection surfaces of the reflection mirrors 8 are coated with Au so that substantially all of light incident from the input optical waveguide 6 can be reflected to the coupling optical waveguides 5a–5d.

Also, the actuators 25a–25d each have an electrode 29 provided on the insulator 33. The electrode 29 is made of Si having conductivity, or the like material, and extends in parallel to the cantilever 26. A comb teeth part 30 consisting of a plurality of teeth is provided at the electrode 29 in a manner such that it faces the comb teeth part 27 of the cantilever 26.

The cantilever 26 and the electrode 29 are connected through a voltage source 31. A pre-determined voltage applied between the cantilever 26 and the electrode 29 by the voltage source 31 generates attraction between them due to electrostatic force such that the cantilever 26 is thereby bent toward the electrode 29 so as to move the reflection mirrors 8 in a direction perpendicular to the coupling optical waveguides 5a–5d.

Because the reflection mirrors 8 are moved by the electrostatic attraction, which does not need much electric current, the reduction of power consumption can be achieved. Also, because the comb teeth part 30 is provided at the electrode 29, the surface area of the electrode 29 increases as a whole. Consequently, the attraction between the cantilever 26 and the electrode 29 is increased, which allows the reflection mirrors 8 to be driven at a low voltage. Thus, a sufficient driving force can be secured even in a case of the cantilever 26 being short.

The MEMS structure 23 is attached, through the spacer 32, to the upper surface of the planar waveguide device 4 such that the cantilevers 26 of the actuators 25a–25d extend in parallel to the coupling optical waveguides 5a–5d so as to cause the reflection mirrors 8a–8d to enter into the trenches 7a–7d of the planar waveguide device 4, respectively.

Generally, as shown in FIG. 2, the cantilevers 26 extend straightly in the first switching parts 2A–2D. In this condition, light incident onto the input optical waveguide 6 simply passes through the trenches 7a–7d to be led to the other part (on the opposite side relative to the trenches 7a–7d) of the input optical waveguide 6. On the other hand, when a given voltage is applied between the cantilever 26 and the electrode 29 by the voltage source 31, the tip portion of the cantilever 26 is pulled to the electrode 29 by the electrostatic force generated in them such that each comb tooth of the comb teeth part 27 enters between the comb teeth of the comb teeth part 30, whereby the reflection mirrors 8a–8d move toward the electrode side. In this condition, light incident on the optical waveguide 6 is reflected by the reflection mirrors 8a–8d and led to the coupling optical waveguides 5a–5d.

The second switching parts 3A–3D are also provided with a structure, which is the same as the MEMS structure 23, on the planar waveguide device 9. In the second switching parts 3A–3D, in a usual off-state, light incident on each coupling optical waveguide 10a–10d simply passes through the trenches 12a–12d. On the other hand, when the reflection mirrors 13a–13d are set to an on-state so as to be moved, light incident on each coupling optical waveguide 10a–10d is reflected by the reflection mirror 13a–13d and led to the output optical waveguide 11. (Contrarily, it is possible to design such that in an off-state, light incident on each coupling optical waveguide 10a–10d is reflected by the reflection mirrors 13a–13d and led to the output optical waveguide 11.)

Figure 5:
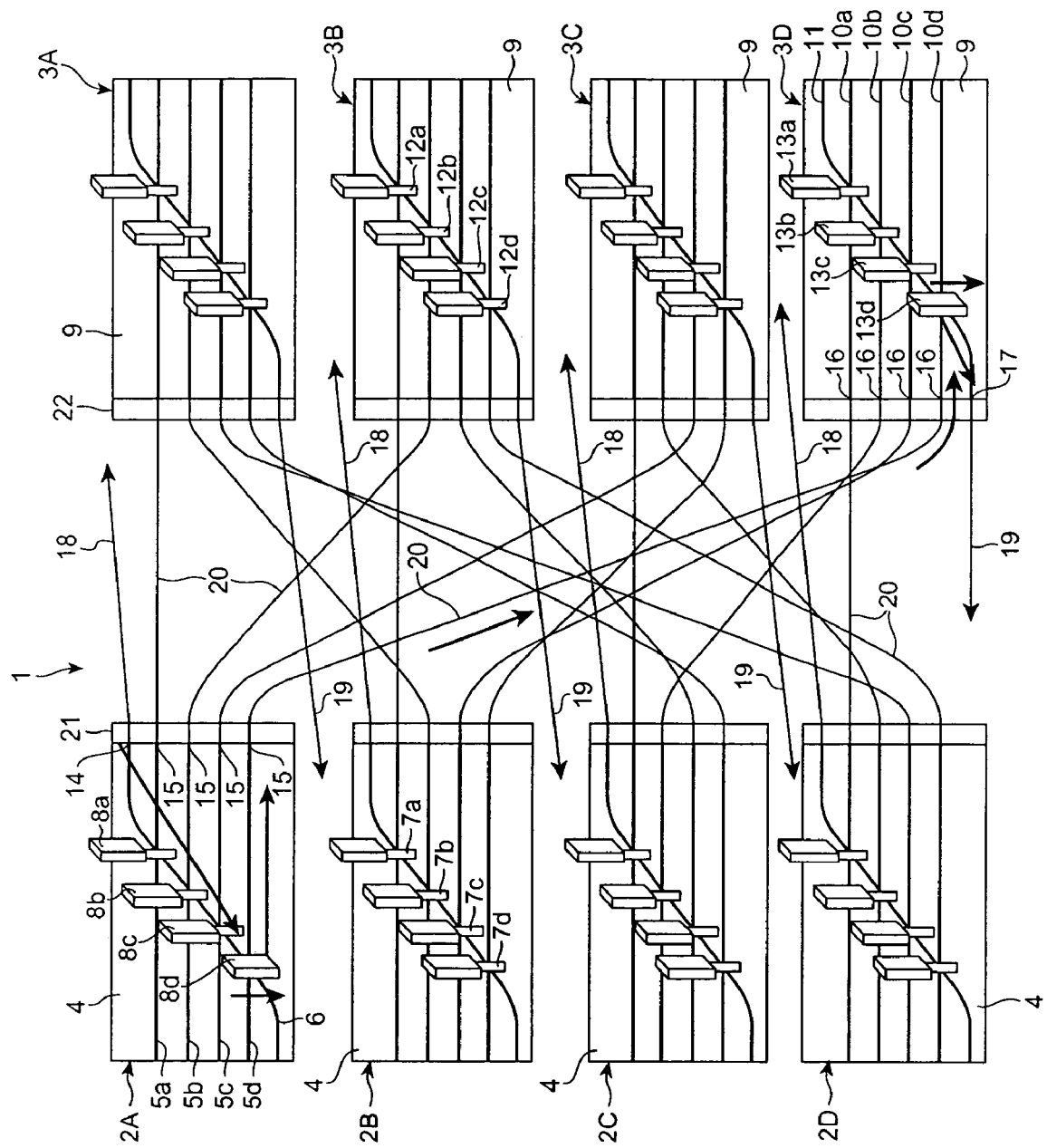
FIG. 5 shows an example of the operation of the optical switch of FIG. 1.

In the optical switch 1 which is structured as described above, in the case where a light signal is incident on the input optical waveguide 6 of the first switching part 2A and emitted from the output optical waveguide 11 of the second switching part 3D, the reflection mirror 8d of the first switching part 2A and the reflection mirror 13d of the second switching part 3D are set to an on-state as shown in FIG. 5. Thus, a light signal traveling through the input optical waveguide 6 of the first switching part 2A passes through the trenches 7a–7c and is reflected at the reflection mirror 8d in the trench 7d. Then, the reflected light signal passes through the coupling optical waveguide 5d and further passes through the optical fiber 20, which connects the first switching parts 2A and 3D together, and is incident on the coupling optical waveguide 10d of the second switching part 3D. The incident light signal traveling through the coupling optical wavelength 10d is reflected at the reflection mirror 13d in the trench 12d, and the reflected light signal travels through the output optical waveguide 11 to be output therefrom.

Figure 6B:
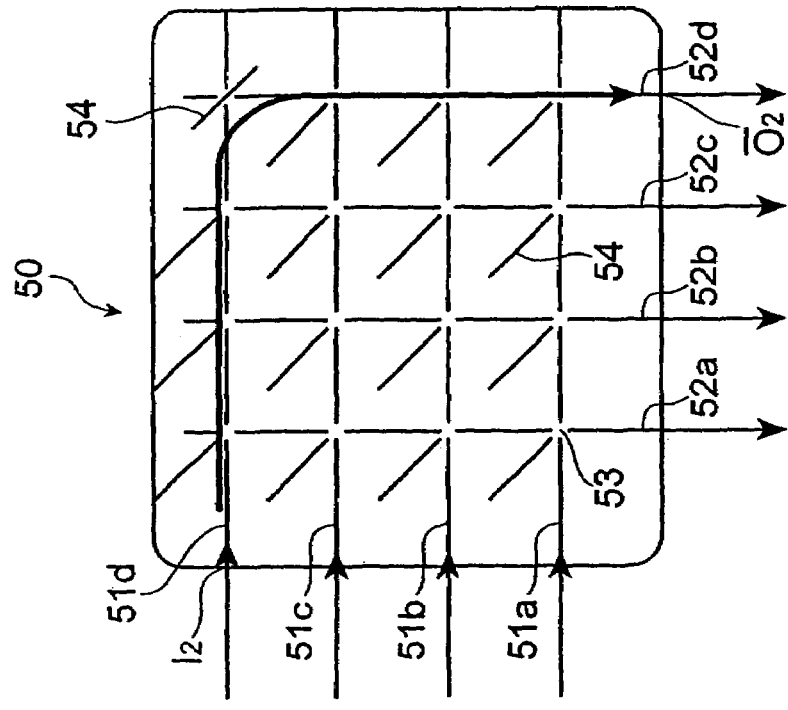
FIG. 6A and FIG. 6B are schematic diagrams showing a 4×4 matrix of optical switch of a comparative example.
Figure 6A:
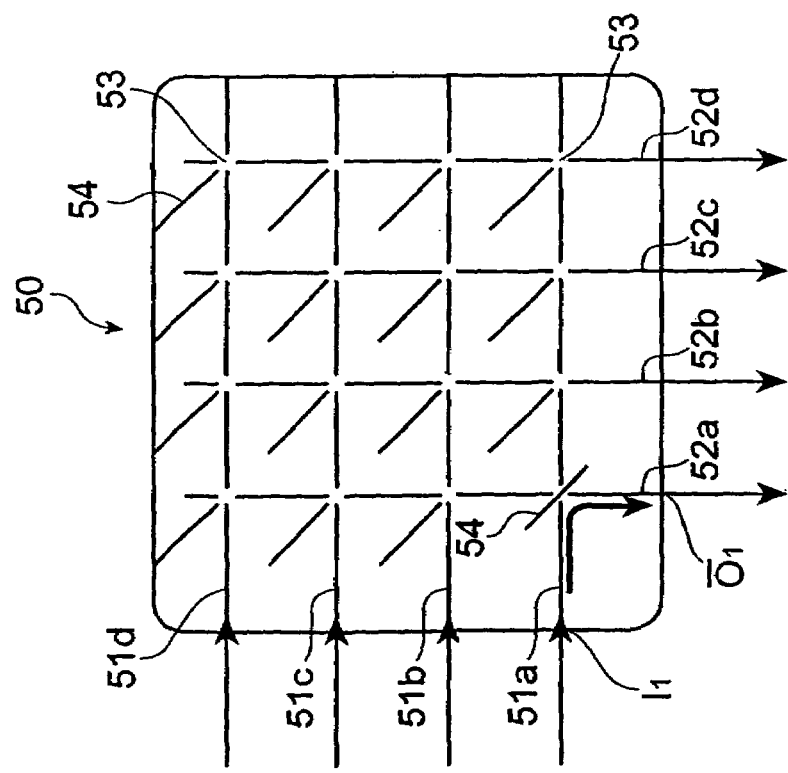

Here, one of generally known conventional 4×4 optical switches is shown in FIG. 6A and in 6B as Comparative Example. In the figures, an optical switch 50 is a matrix switch having four optical waveguides 51a–51d, which extend in a transverse direction, and four optical waveguides 52a–52d, which extend in a vertical direction. The optical switch 50 has 16 reflection mirrors 54 which are placed in the trenches 53 formed at cross points of optical waveguides 51a–51d and optical waveguides 52a–52d, and which are to reflect incident light from the optical waveguides 51a–51d toward the optical waveguides 52a–52d.

In the optical switch 50, in order to make a light signal be incident on the optical waveguide 51a so as to emit it from the optical waveguide 52a, the reflection mirror 54 at the cross-point of the optical waveguides 51a and 52a is set to an on-state as shown in FIG. 6A. In the case of making a light signal be incident on the optical waveguide 51d so as to emit it from the optical waveguide 52d, the reflection mirror 54 at the cross-point the optical waveguides 51d and 52d as shown in FIG. 6B.

There are differences between the course shown in FIG. 6A and the course shown in FIG. 6B with respect to the distance (i.e., optical path length) which a light signal travels and the number of the optical path switching elements through which a light signal passes in the optical waveguide. Generally, in a planar waveguide device, the optical loss increases according to the increase of the length of the optical waveguide through which a light signal travels and the optical loss (i.e., insertion loss) increases according to the increase in the number of the optical path switching elements through which a light signal passes. For example, at the wavelength of 1550 nm, the optical loss of the optical waveguide is 0.4 dB/cm. Also, the optical loss caused by a passage of light through one optical path switching element is about 0.5 dB. Therefore, the difference in the optical losses between the course shown in FIG. 6A and the course shown in FIG. 6B is about 3.3 dB as a whole, which is very large.

In contrast, in the optical switch 1 of the present embodiment, the distance (i.e., optical path length), excluding the coupling optical fibers 20, between the input port 14 of the first switching parts 2A–2D and the output port 17 of the second switching parts 3A–3D is equal with respect to all courses. Also, the total in the number of the optical path switching elements through which a light signal passes from the input port 14 of the first switching part 2A–2D to the output port 17 of the second switching part 3A–3D is five in any courses. The optical loss of coupling optical fibers 20 can be ignored if the difference in the length of the coupling optical fibers is several cm or tens of cm, even if the length of the coupling optical fibers 20 is not all uniform. Therefore, the loss of light traveling through (N×N) optical paths formed between the input port and the output port in the optical switch 1 is substantively equal regardless of the course through which the light signal travels. Thus, the difference in the optical loss due to the difference in the course between the input port and the output port can be reduced sufficiently.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

Figure 7:
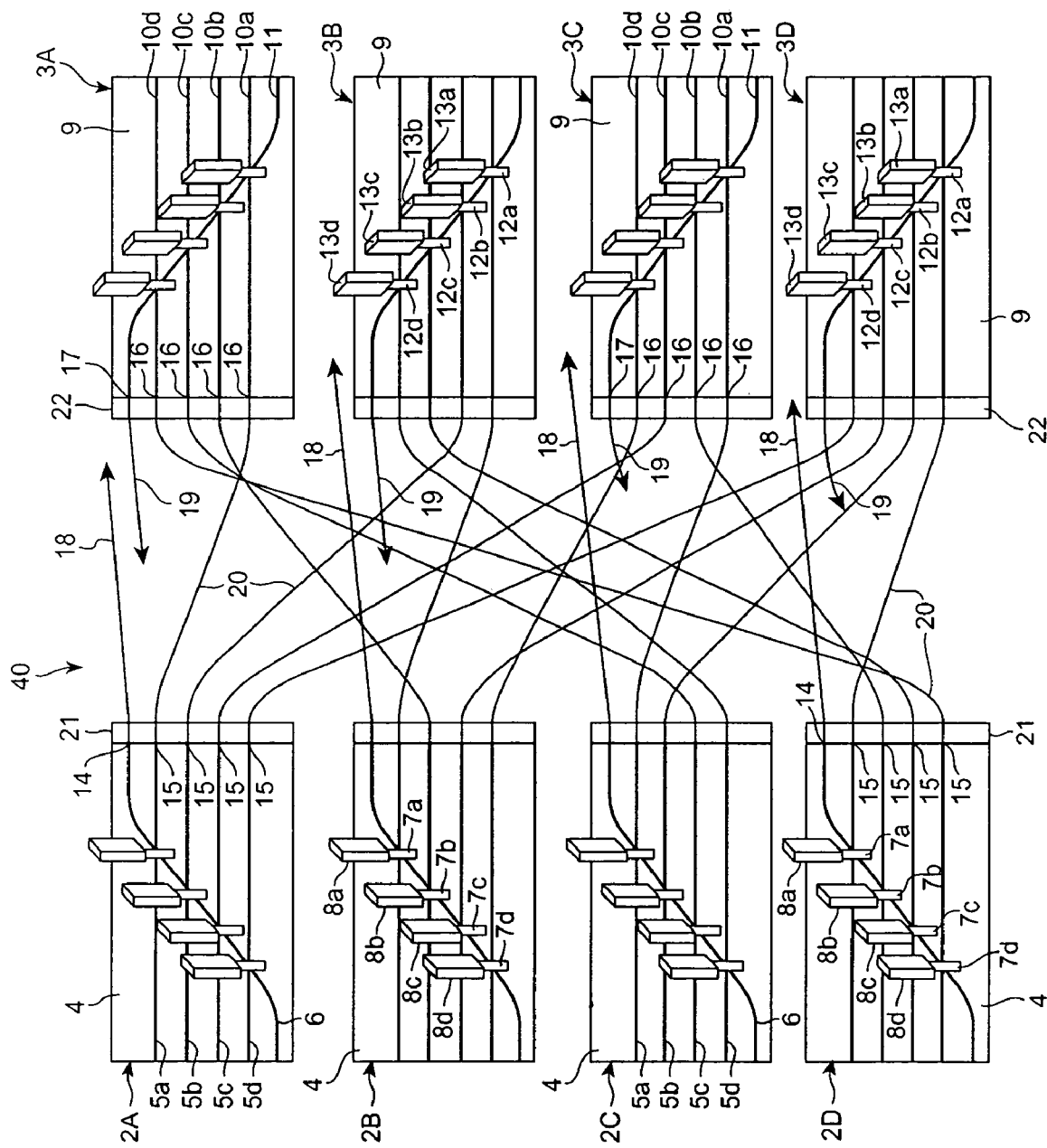
FIG. 7 is a schematic diagram showing an optical switch according to another embodiment of the present invention.

For example, an optical switch may have a structure such as an optical switch 40 shown in FIG. 7 instead of adopting the same structure for the first switching parts 2A–2D and the second switching parts 3A–3D as described in the above embodiment. In the optical switch 40, the pattern of the waveguides in the first switching part 2A–2D is equivalent to the turned-over pattern of the waveguides in the second switching parts 3A–3D. The reflection mirrors 8a–8d and 13a–13d may be moved with electromagnetic actuators. The reflection mirrors 8a–8d and 13a–13d may be moved in a direction perpendicular to the substrate. The present invention can be applied if it is an N×N switch having N number of input ports and N number of output port.

The entire disclosure of Japanese Patent Application No. 2003-065472 filed on Mar. 11, 2003, including specification, claims drawings and summary, is incorporated herein by reference in its entirety.

What is claimed is:

1. An optical switch provided with N number of input ports and N number of output ports (herein "N" is a plural number), comprising:
   N number of first switching parts each having one input port of the N number of input ports and N number of first coupling ports;
   N number of second switching parts each having one output port of the N number of output ports, N number of second coupling ports; and
   N×N number of optical fibers connecting the first coupling ports and the second coupling ports, wherein
   P1i each of half the number or more of first coupling ports the N×N first coupling ports are connected with second coupling ports P2(N+1−i), where P1i is a first coupling port corresponding to an optical path which comes in the "i"th shortest one in terms of the optical path length between the input port and one of the first coupling ports in each first switching part, and P2j is a second coupling port corresponding to the "j"th shortest one in terms of the optical path length between the output port and one of the second coupling ports in each second switching part, wherein the optical path length from the input port to the output port in the respective N×N number of optical paths is substantially the same.

2. An optical switch provided with N number of input ports and N number of output ports (herein "N" is a plural number), comprising:
   N number of first switching parts each having one input port of the N number of input ports, N number of first coupling ports, and a plurality of optical path switching elements;
   N number of second switching parts each having one output port of the N number of output ports, N number of second coupling ports, and a plurality of optical path switching elements; and
   N×N number of optical fibers connecting the first coupling ports and the second coupling ports,
   wherein the differences between the maximum and the minimum in terms of the number of the optical path switching elements through which light passes in N×N number optical paths from the input port to the output port are equal to or less than 4, wherein each of the first switching parts comprises:
   a first planar waveguide device having N number of first coupling optical waveguides and an input optical waveguide, each of the first coupling optical waveguides including a first coupling port, and the input optical waveguide including the input port and being formed so as to cross the first coupling optical waveguides;

N number of first reflection mirrors for reflecting an incident light signal from the input optical waveguide to the respective first coupling optical waveguides, the first reflection mirrors being inserted respectively in trenches formed at the cross-points of the first coupling optical waveguides and the input optical waveguide; and first actuators driving the respective first reflection mirrors; and each of the second switching parts comprises:

a second planar waveguide device having N number of second coupling optical waveguides and an output optical waveguide, each of the second coupling optical waveguides including a second coupling port, and the output optical waveguide including the output port and being formed so as to cross the second coupling optical waveguides;

N number of second reflection mirrors for reflecting an incident light signal from the second coupling optical waveguides toward the output optical waveguide, the second reflection mirrors being inserted respectively in trenches formed at the cross-points of the second coupling optical waveguides and the output optical waveguide; and second actuators driving the respective second reflection mirrors.

3. An optical switch provided with N number of input ports and N number of output ports (herein "N" is a plural number), comprising:

N number of first switching parts each having one input port of the N number of input ports and N number of first coupling ports;

N number of second switching parts each having one output port of the N number of output ports, N number of second coupling ports; and N×N number of optical fibers connecting the first coupling ports and the second coupling ports, wherein P1$i$ each of half the number or more of first coupling ports of the N×N first coupling ports are connected with second coupling ports P2(N+1−i), where P1$i$ is a first coupling port corresponding to an optical path which comes in the "I"th shortest one in terms of the optical path length between the input port and one of the first coupling ports in each first switching part, and P2$j$ is a second coupling port corresponding to the "j"th shortest one in terms of the optical path length between the output port and one of the second coupling ports in each second switching part, wherein each of the first switching parts comprises:

a first planar wave guide device having N number of first coupling optical wageguides and an input optical waveguide, each of the first coupling optical waveguides including a first coupling port, and the input optical waveguide including the input port and being formed so as to cross the first coupling optical waveguides;

N number of first reflection mirrors for reflecting an incident light signal from the input optical waveguide to the respective first coupling optical waveguides, the first reflection mirrors being inserted respectively in trenches formed at the cross-points of the first coupling optical waveguide and the input optical waveguide; and first actuators driving the respective first reflection mirrors; and each of the second switching parts comprises:

a second planar waveguide device having N number of second coupling optical waveguides and an output optical waveguide, each of the second coupling optical waveguides including a second coupling port, and the output optical waveguide including the output port and being formed so as to cross the second coupling optical waveguides;

N number of second reflection mirrors for reflecting an incident light signal from the second coupling optical waveguides toward the output optical waveguide, the second reflection mirrors being inserted respectively in trenches formed at the cross-points of the second coupling optical waveguides and the output optical waveguide; and second actuators driving the respective second reflection mirrors.

4. An optical switch as defined in claim 2 or 3, wherein the first and second reflection mirrors are fixed to cantilevers provided over the first and second planar waveguide devices, respectively; and the first and second actuators have electrodes provided over the first and second planar waveguide devices, and means for generating electrostatic attraction between the electrodes and the cantilevers.

5. An optical switch as defined in claim 4, wherein the electrodes and the cantilevers are equipped with comb teeth parts disposed facing each other.

* * * * *